US012638297B2

(12) United States Patent
    Beaurepaire

(10) Patent No.: US 12,638,297 B2
(45) Date of Patent: May 26, 2026

(54) METHOD AND APPARATUS FOR RISK COMPUTATION OF CONCEALED AREAS ON A STREET

(71) Applicant: HERE Global B.V., Eindhoven (NL)

(72) Inventor: Jerome Beaurepaire, Courbevoie (FR)

(73) Assignee: HERE GLOBAL B.V., Eindhoven (NL)

( * ) Notice: Subject to any disclaimer, the term of this patent is extended or adjusted under 35 U.S.C. 154(b) by 367 days.

(21) Appl. No.: 17/980,318

(22) Filed: Nov. 3, 2022

(65) Prior Publication Data

US 2024/0151541 A1    May 9, 2024

(51) Int. Cl.
    *G01C 21/34* (2006.01)
    *G01C 21/00* (2006.01)

(52) U.S. Cl.
    CPC ..... *G01C 21/3461* (2013.01); *G01C 21/3815* (2020.08); *G01C 21/3841* (2020.08)

(58) Field of Classification Search
    CPC ............ G01C 21/3461; G01C 21/3815; G01C 21/3841
    See application file for complete search history.

(56) References Cited

U.S. PATENT DOCUMENTS

| | | | |
|---|---|---|---|
| 10,989,556 B1 * | 4/2021 | Nepomuceno ..... | G01C 21/3492 |
| 2016/0047666 A1 * | 2/2016 | Fuchs ................... | G06Q 40/08 |
| | | | 701/423 |

| | | | |
|---|---|---|---|
| 2016/0086285 A1 * | 3/2016 | Jordan Peters .. | G08G 1/096827 |
| | | | 701/484 |
| 2020/0175870 A1 | 6/2020 | Oh et al. | |

FOREIGN PATENT DOCUMENTS

| | | | | |
|---|---|---|---|---|
| CN | 205644976 U | | 10/2016 | |
| CN | 117437772 A | * | 1/2024 | ......... G01C 21/3476 |
| JP | 2020030802 A | | 2/2020 | |
| KR | 102183752 B1 | | 11/2020 | |
| KR | 102278581 B1 | | 7/2021 | |

* cited by examiner

*Primary Examiner* — Vladimir Magloire
*Assistant Examiner* — Ashley Brown Raynal
(74) *Attorney, Agent, or Firm* — DITTHAVONG, STEINER & MLOTKOWSKI

(57)    ABSTRACT

An approach is provided for computation of risk index. The approach, for example, involves acquiring historical probe data associated with an area. The historical probe data comprises data associated with distribution of vehicles entering or leaving the area in a given time partition. The approach further involves obtaining map feature data associated with an entrance or exit of the area, from a geographical database. The map feature data comprises data associated with physical objects in vicinity of the area. The approach further involves computing a risk index for the entrance or the exit for the given time partition, based on the historical probe data and the map feature data. The risk index indicates a probability of occurrence of a hazard in the vicinity of the entrance or the exit. The approach further involves storing the risk index as an attribute of the entrance or the exit in the geographic database.

20 Claims, 13 Drawing Sheets

121

MAPPING PLATFORM

201 — PROBE DATA ACQUISITION MODULE

MAP FEATURE DATA OBTAINING MODULE — 203

205 — RISK INDEX COMPUTATION MODULE

RISK INDEX STORAGE MODULE — 207

400A

RETRIEVE HISTORICAL PROBE DATA ASSOCIATED WITH AREA — 401

OBTAIN FEATURE DATA ASSOCIATED WITH ENTRANCE OR EXIT OF AREA — 403

COMPUTE RISK INDEX FOR ENTRANCE OR EXIT OF AREA FOR GIVEN TIME PARTITION — 405

STORE RISK INDEX — 407

501

503

ALERT!

PARKING LOT AT 700 METERS
ON THE RIGHT ON
ST.CATHEDRAL STREET.

RISK INDEX: 0.9

VIEW ALTERNATE
ROUTE

505

METHOD AND APPARATUS FOR RISK COMPUTATION OF CONCEALED AREAS ON A STREET

BACKGROUND

Typically, in a dense urban environment, there may be a few concealed areas, such as hidden parking lots on a street. For example, a parking lot may exist between two buildings that may be invisible to another entity at a first glance, such as to a pedestrian or a micro-mobility driver. In some instances, underground parking lots may exist that may be difficult for the other entity to locate while walking or driving. Moreover, physical objects such as trees, street-lights, banners, and the like may further hamper the visibility of the parking lots for the other entity as well as for a driver of a vehicle exiting out of the parking lot. Generally, the parking lots may be deep or sloped parking lots that may require a strong acceleration of the vehicle to exit out of the parking lot. In such cases, there may be a high possibility of accidents, such as collision of the exiting vehicle with the other entity, such as the pedestrian, the micro-mobility driver, or a bicyclist. Thus, there is a need of a method to overcome challenges such as occurrence of the accidents, faced by the other entities such as the pedestrian, the micro-mobility driver, the bicyclist, or the like.

SOME EXAMPLE EMBODIMENTS

Therefore, there is a need for computing risk associated with an area, such as a concealed parking lot.

According to one embodiment, a method comprises acquiring historical probe data associated with an area from one or more devices in the area. The historical probe data comprises a data associated with a distribution of vehicles entering or leaving the area in a given time partition. The method further comprises obtaining map feature data associated with at least one of an entrance or an exit of the area, from a geographical database. The map feature data comprises data associated with one or more physical objects in vicinity of the area. The method further comprises computing a risk index for the at least one of the entrance or the exit of the area for the given time partition, based on the historical probe data and the map feature data for the at least one of the entrance or the exit of the area. The risk index indicates a probability of occurrence of a hazard in the vicinity of the at least one of the entrance or the exit of the area. The method further comprises storing the risk index as an attribute of the at least one of the entrance or the exit of the area in the geographic database.

According to another embodiment, an apparatus comprises at least one processor, and at least one memory including computer program code for one or more computer programs, the at least one memory and the computer program code configured to, with the at least one processor, cause, at least in part, the apparatus to acquire historical probe data associated with an area from one or more devices in the area. The historical probe data comprises a data associated with a distribution of vehicles leaving the area in a given time partition. The apparatus is also caused to obtain map feature data associated with at least one of an entrance or an exit of the area, from a geographical database. The map feature data comprises data associated with one or more physical objects in vicinity of the area. The apparatus is further caused to compute a risk index for the at least one of the entrance or the exit of the area for the given time partition, based on the historical probe data and the map feature data for the at least one of the entrance or the exit of the area. The risk index indicates a probability of occurrence of a hazard in vicinity of the at least one of the entrance or the exit of the area. The apparatus is further caused to store the risk index as an attribute of the at least one of the entrance or the exit of the area in the geographic database.

According to another embodiment, a non-transitory computer-readable storage medium carries one or more sequences of one or more instructions which, when executed by one or more processors, cause, at least in part, an apparatus to acquire historical probe data associated with an area from one or more devices in the area. The historical probe data comprises a data associated with a distribution of vehicles leaving the area in a given time partition. The apparatus is also caused to obtain map feature data associated with at least one of an entrance or an exit of the area, from a geographical database. The map feature data comprises data associated with one or more physical objects in vicinity of the area. The apparatus is further caused to compute a risk index for the at least one of the entrance or the exit of the area for the given time partition, based on the historical probe data and the map feature data for the at least one of the entrance or the exit of the area. The risk index indicates a probability of occurrence of a hazard in vicinity of the at least one of the entrance or the exit of the area. The apparatus is further caused to store the risk index as an attribute of the at least one of the entrance or the exit of the area in the geographic database.

In addition, for various example embodiments described herein, the following is applicable: a computer program product may be provided. For example, a computer program product comprising instructions which, when executed by a computer, cause the computer to perform any one or any combination of methods (or processes) disclosed herein.

According to another embodiment, an apparatus comprises means for acquiring historical probe data associated with an area from one or more devices in the area. The historical probe data comprises a data associated with a distribution of vehicles entering or leaving the area in a given time partition. The apparatus further comprises means for obtaining map feature data associated with at least one of an entrance or an exit of the area, from a geographical database. The map feature data comprises data associated with one or more physical objects in vicinity of the area. The apparatus further comprises means for computing a risk index for the at least one of the entrance or the exit of the area for the given time partition, based on the historical probe data and the map feature data for the at least one of the entrance or the exit of the area. The risk index indicates a probability of occurrence of a hazard in the vicinity of the at least one of the entrance or the exit of the area. The risk index is then stored as an attribute of the at least one of the entrance or the exit of the area in the geographic database.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for conducting the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for computation and storage of a risk index of an area are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
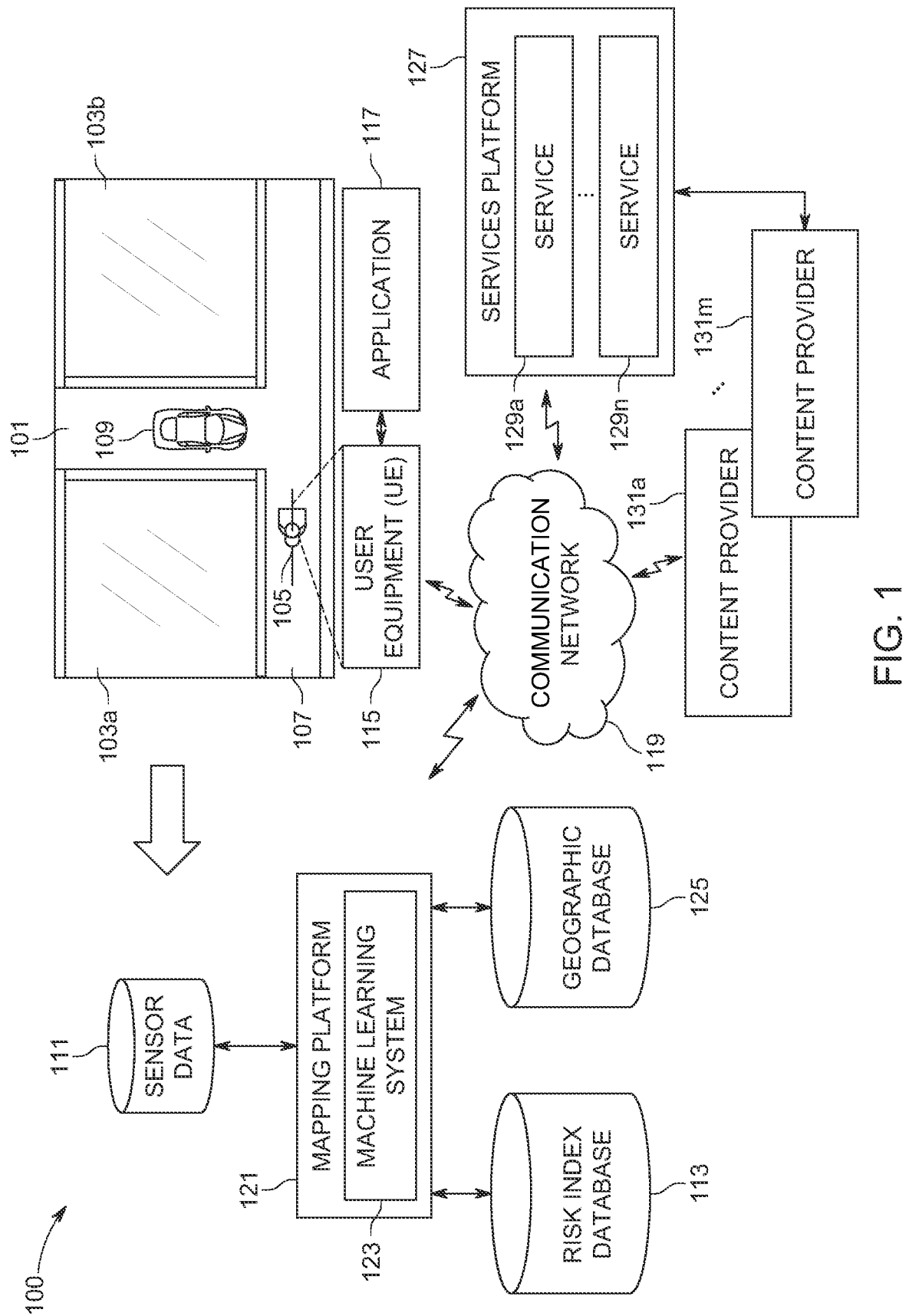
FIG. 1 is a diagram of a system capable of computing and storing a risk index for an entrance or an exit of an area, according to one embodiment.

FIG. 1 is a diagram of a system 100 capable of computing and storing a risk index for an entrance or an exit of an area, according to one embodiment. An area such as a parking lot 101 may be present between buildings, such as a building 103a and a building 103b. The parking lot 101 may be concealed or hidden from a user 105 due to a location of the parking lot 101 between the building 103a and the building 103b. For example, the user 105 may be travelling via a bicycle or via a micro mobility vehicle on a road 107, a bike lane, a sidewalk, and the like. The parking lot 101 may be construed as a building from a perspective of the user 105. Further, a vehicle 109 may be exiting from the parking lot 101 at a same time as a time of travel of the user 105 near an exit of the parking lot 101. Moreover, a driver of the vehicle 109 may be unable to locate the user 105 travelling towards the exit of the parking lot 101 due to presence of the building 103a and the building 103b on sides of the vehicle 109. To that end, the exit of the parking lot 101 may also be same as an entrance of the parking lot 101, and either of the two terms may be used interchangeably, without deviating from the scope of the present disclosure. In such a scenario, there may be risk of accident between the user 105 and the vehicle 109. For example, the user 105 and the vehicle 109 may collide together.

To address the aforementioned challenges, the system 100 of FIG. 1 introduces a capability to compute a risk index for at least one of the entrance or the exit of the area, such as the parking lot 101 for a given time partition. The computed risk index may be communicated to the user 105, for example, via a notification, such that the user 105 may be alerted about the risk at an appropriate time. The risk index may be computed based on historical probe data and map feature data. The historical probe data may be associated with the area, such as the parking lot 101 that may be acquired from one or more devices in the area. For example, the devices may be imaging devices associated with the vehicle 109 or employed at the parking lot 101. The historical probe data may include data associated with a distribution of vehicles entering or leaving the area, such as the parking lot 101 in a given time partition. In some embodiments, the given time partition may be at least one of a time of day, a time of week, a time of season, a time of year, or a combination thereof.

The map feature data may be obtained from a geographical database 125. The map feature data may be associated with at least one of the entrance or the exit of the area, such as the parking lot 101. The map feature data comprises data associated with one or more physical objects in vicinity of the area. The vicinity of the area may be defined as a threshold distance around the entrance or the exit of the area. In an embodiment, the threshold distance may be between 1 meter and 20 meters. For example, the physical objects may be a streetlight, a tree, a banner, a traffic light, an electric pole, and the like. The risk index may be computed for the at least one of the entrance or the exit of the area, such as the parking lot 101 for the given time partition, based on the historical probe data and the map feature data for the at least one of the entrance or the exit of the area. The risk index indicates a probability of occurrence of a hazard in the vicinity of the at least one of the entrance or the exit of the area. For example, the risk index may be a value between 0 and 1, or any other suitable range or scale. The risk index may be stored as an attribute of the at least one of the entrance or the exit of the area in the geographic database 125. In an embodiment, the stored risk index may be provided with a mapping user interface to the user 105 that may be utilized by the user 105 for awareness or to avoid occurrence of accidents.

Figure 2:
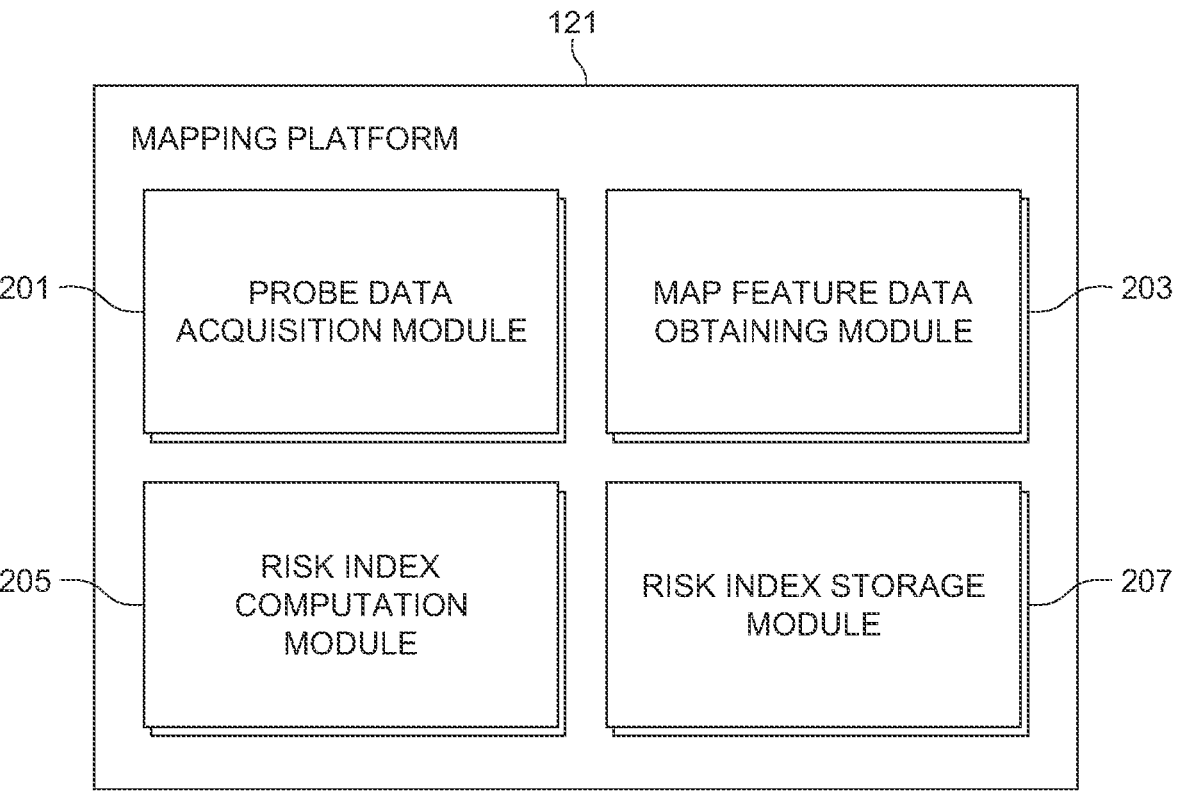
FIG. 2 is a diagram of components of a mapping platform capable of computing and storing the risk index for the entrance or the exit of the area, according to one embodiment.

FIG. 2 is a diagram of components of a mapping platform 121 capable of computing and storing the risk index for the entrance or the exit of the area, according to one embodiment. In one embodiment, as shown in FIG. 2, the mapping platform 121 of the system 100 includes one or more components for computing the risk index for the entrance or the exit of the area, such as the parking lot 101 according to the various embodiments described herein. It is contemplated that the functions of the components of the mapping platform 121 may be combined or performed by other components of equivalent functionality. As shown, in one embodiment, the mapping platform 121 includes a probe data acquisition module 201, a map feature data obtaining module 203, a risk index computation module 205, and a risk index storage module 207. The above presented modules and components of the mapping platform 121 can be implemented in hardware, firmware, software, or a combination thereof. Though depicted as a separate entity in FIG. 1, it is contemplated that the mapping platform 121 may be implemented as a module of any of the components of the system 100 (e.g., a component of the services platform 127, services 129, content providers 131, the vehicle 109, user equipment (UE) 115, applications 117, and/or the like). In another embodiment, one or more of the modules 201-207 may be implemented as a cloud-based service, local service, native application, or combination thereof. The functions of the mapping platform 121 and modules 201-207 are discussed with respect to figures below.

Figure 3B:
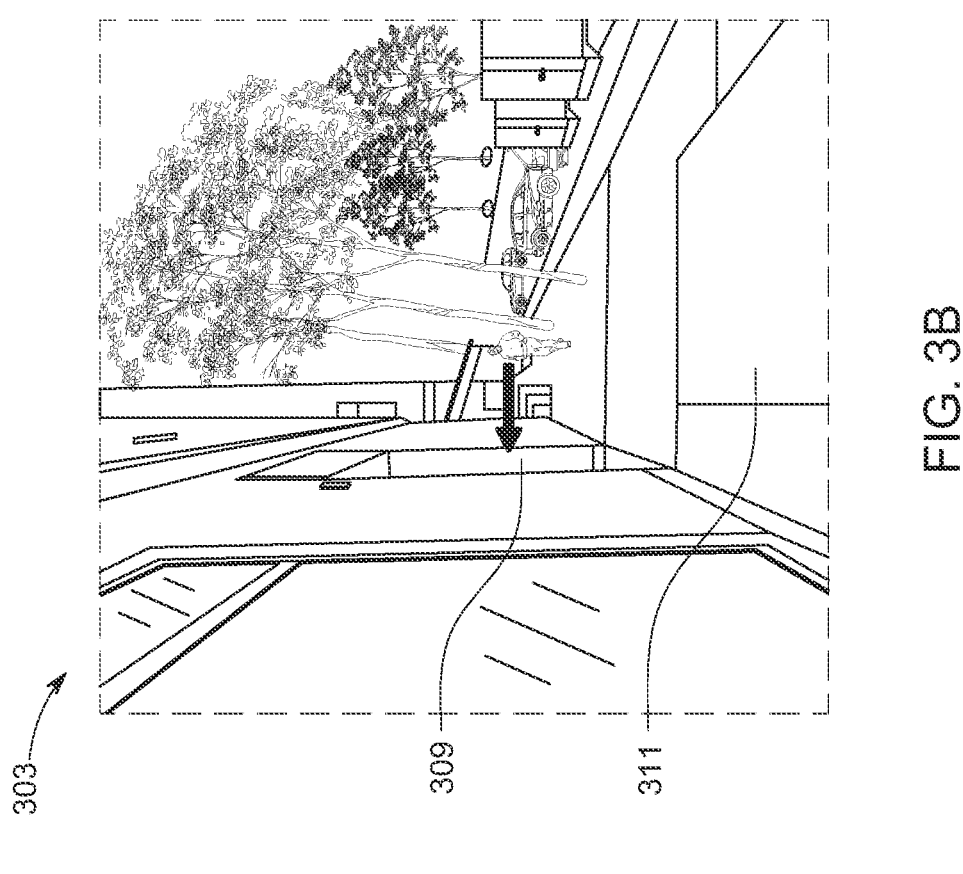
FIGS. 3A-3C are example areas, according to one embodiment.
Figure 3A:
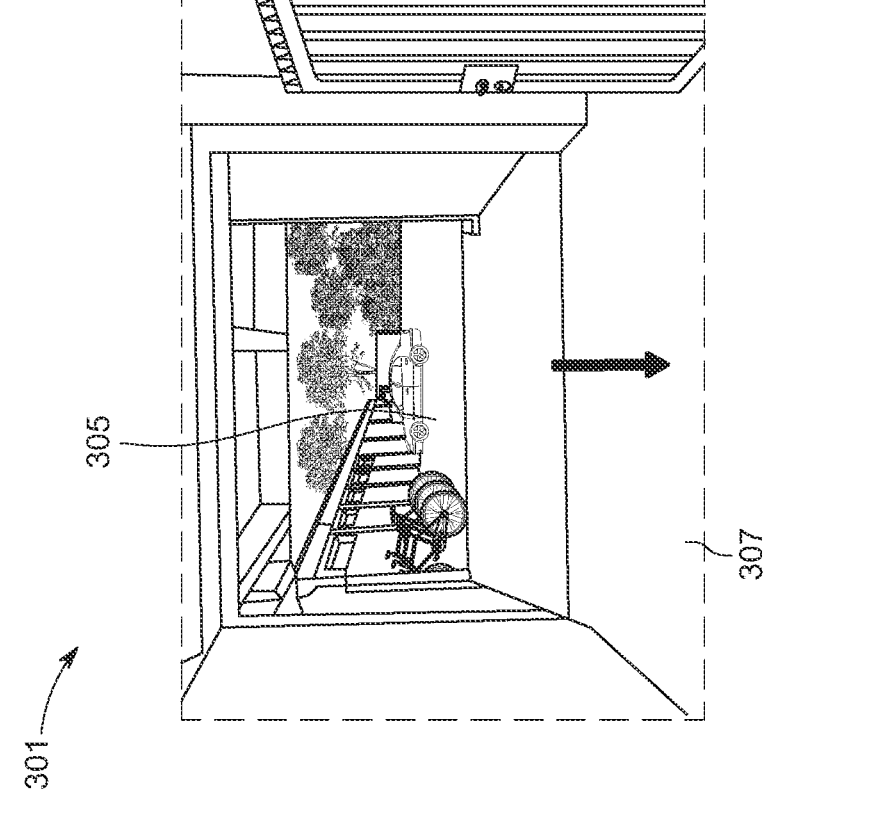
Figure 3C:
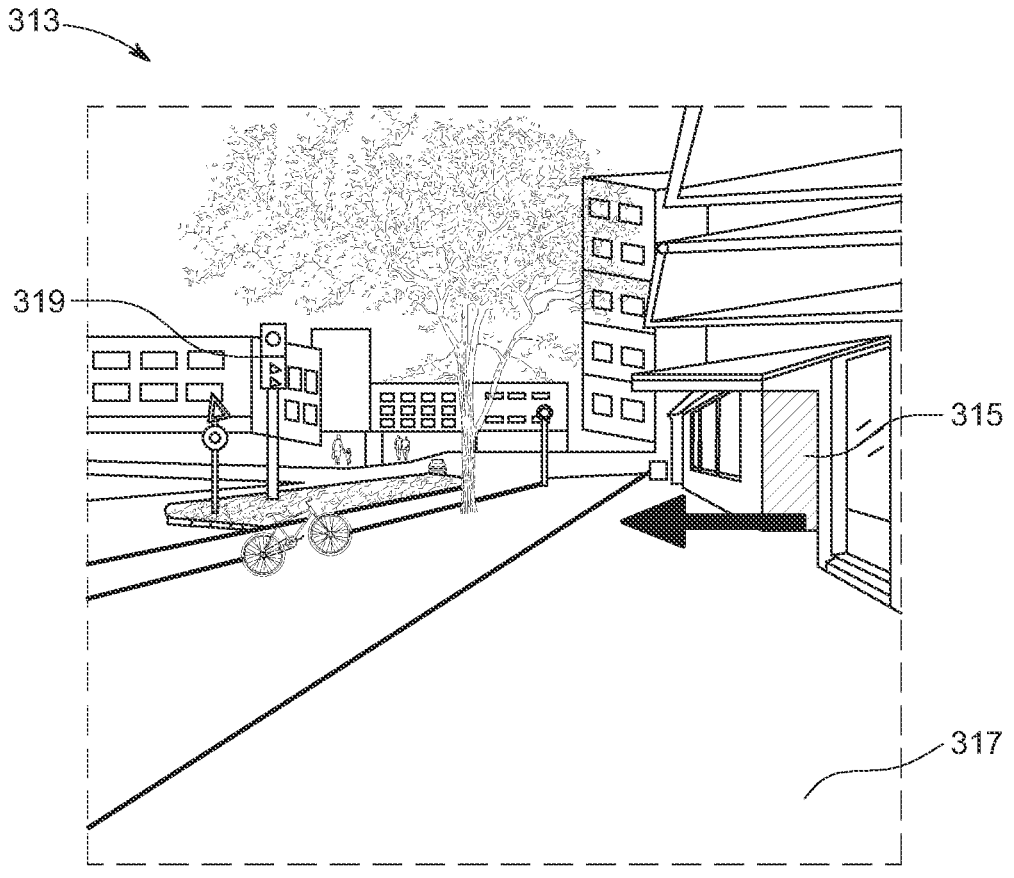

FIGS. 3A, 3B and 3C are example areas, according to one embodiment. FIG. 3A shows a diagram 301 of an entrance and an exit of a first area. FIG. 3B shows a diagram 303 of the exit of a second area with a narrow sidewalk. FIG. 3C shows a diagram 313 of the exit of a third area with a broad sidewalk.

In some embodiments, the area may include one or more of an underground parking area, a garage, and a basement. The diagram 301 includes the first area that may be a parking lot 305. The parking lot 305 may be used for the parking of the vehicles, such as cars, bicycles, two-wheelers, and so forth. For example, the parking lot 305 may be an open space where the vehicles may be parked. In certain scenarios, the entrance of the parking lot 305 may be same as the exit of the parking lot 305. For example, the parking lot 305 may have a same pathway for entrance as well as for the exit of the vehicles. In such a case, in order to enter the parking lot 305, the vehicle may need to be driven via an entrance or an exit 307 of the parking lot 305. The vehicles exiting out of the entrance or the exit 307 may be unable to locate the users, such as the pedestrians or other vehicles outside of the entrance or the exit 307, due to presence of walls on both sides of the vehicles while exiting.

The diagram 303 includes the second area that may be an underground parking area (not shown in FIG. 3B). The diagram 303 depicts an exit 309 of the underground parking area. The underground parking area may be in-between a building as depicted. The exit 309 of the underground parking area may be connected to a sidewalk 311. The sidewalk 311 may be a narrow sidewalk as depicted. In such a case, the users on the sidewalk 311, such as the micro mobility users may be unable to clearly identify the exit 309 of the underground parking area, as the exit 309 may look like, for example, an entrance to the building. Moreover, the vehicles exiting out of the exit 309 may be required to cross the sidewalk 311 to reach the street. The sidewalk 311 may further by followed by a bike lane that may needed to be crossed by the exiting vehicle to reach the street. The street and/or sidewalk in such a case may be invisible or be substantially occluded to the driver of the vehicles exiting out of the exit 309. Further, a color contrast of the exit 309 as compared to the sidewalk 311 and the building may be low. Due to the low color contrast, the detection of the exit 309 may be difficult by the users. Furthermore, the exit 309 may have objects nearby, such as trees that may further hinder the detection of the exit 309 by the users and the detection of the users by the driver of the vehicles exiting out of the exit 309. Thus, the presence of the narrow sidewalk 311 with the presence of the bike lane and the nearby objects may be a "high-risk" scenario where the driver of the vehicles exiting out of the exit 309 may be unable to detect the users, such as the pedestrians or the vehicles, such as the bicycles outside the exit 309.

The diagram 313 includes the third area having an exit 315 with a sidewalk 317 outside the exit 315. The sidewalk 317 may be a broader sidewalk as compared to the sidewalk 311. Moreover, the vehicles exiting out of the exit 315 may be required to cross the sidewalk 317 to reach the street. The sidewalk 317 may further by followed by the bike lane that may needed to be crossed by the exiting vehicle to reach the street. Thus, the users, such as the pedestrians may be visible to the driver of the vehicles exiting out of the exit 315. The vehicles exiting out of the exit 315 via the broad sidewalk 317 may be able to locate the street in an easy manner. Further, the color contrast of the exit 315 as compared to the sidewalk 317 and the building may be high. For example, the sidewalk 317 may be grey in color whereas the walls of the exit 315 may be white in color. In addition, a parking sign board 319 may be present for the detection of the exit 315. In such a case, the users on the sidewalk 317 may be able to identify the exit 315 from a distance. Thus, the presence of the broad sidewalk 317 with the presence of the parking sign board 319 may be a "low-risk" scenario where the users, such as the pedestrians or the vehicles, such as the bicycles outside the exit 315 may be able to detect the vehicles exiting out of the exit 315. However, the exit 315 and similar exits may still be difficult to detect, for example, in case when the sidewalk 317 is crowded. Thus, such scenarios may lead to accidents of the users and the vehicles exiting out of the areas, such as the parking areas. Details of the method to compute the risk index associated with the entrances or exits of the areas and providing such information associated with the risk index to the users and/or the vehicle drivers exiting out of the areas are further provided, for example, in FIGS. 4, 5 and 6.

Figure 4A:
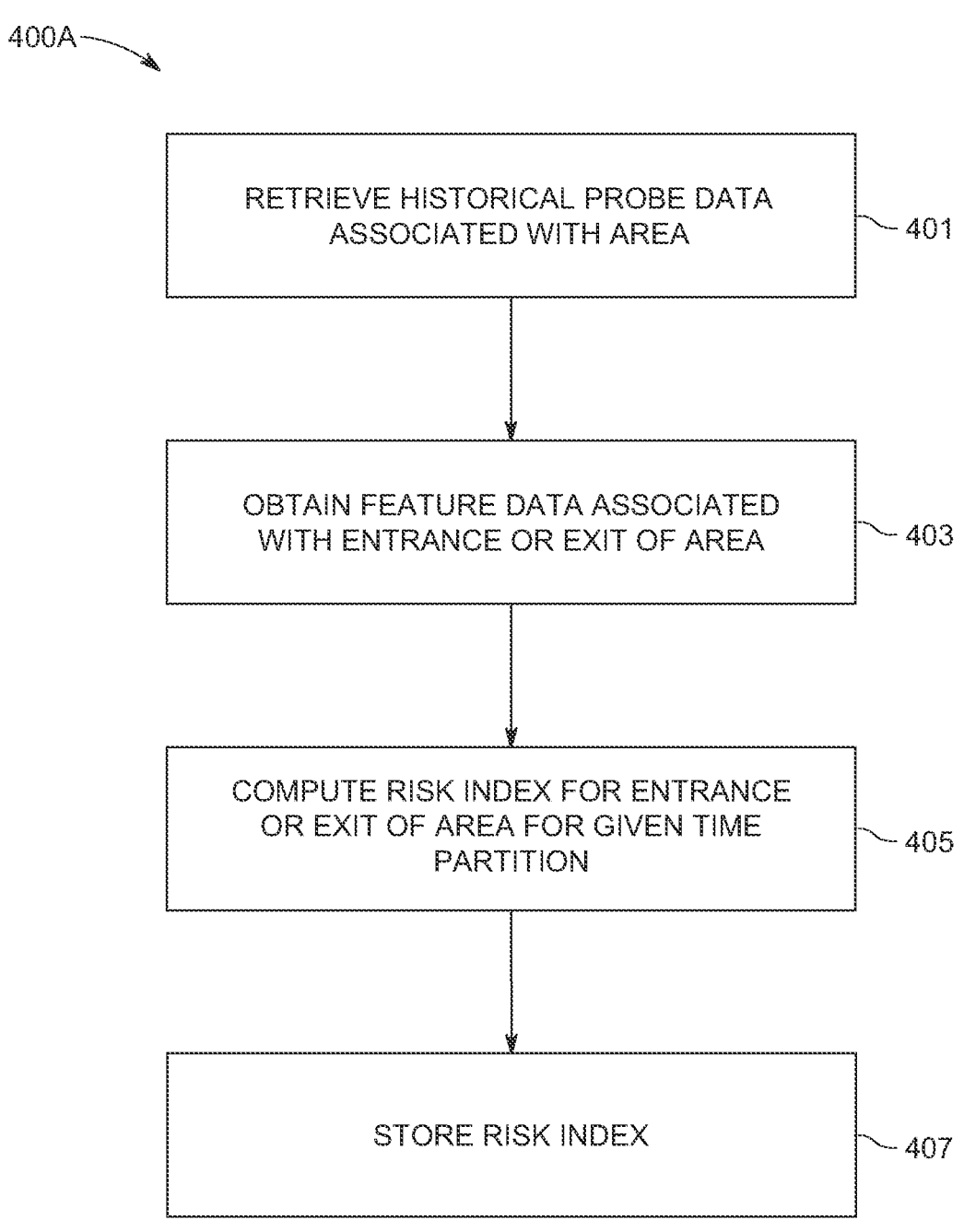
FIG. 4A is a flowchart of a process for computing and storing the risk index for the entrance or the exit of the area, according to one embodiment.
Figure 9:
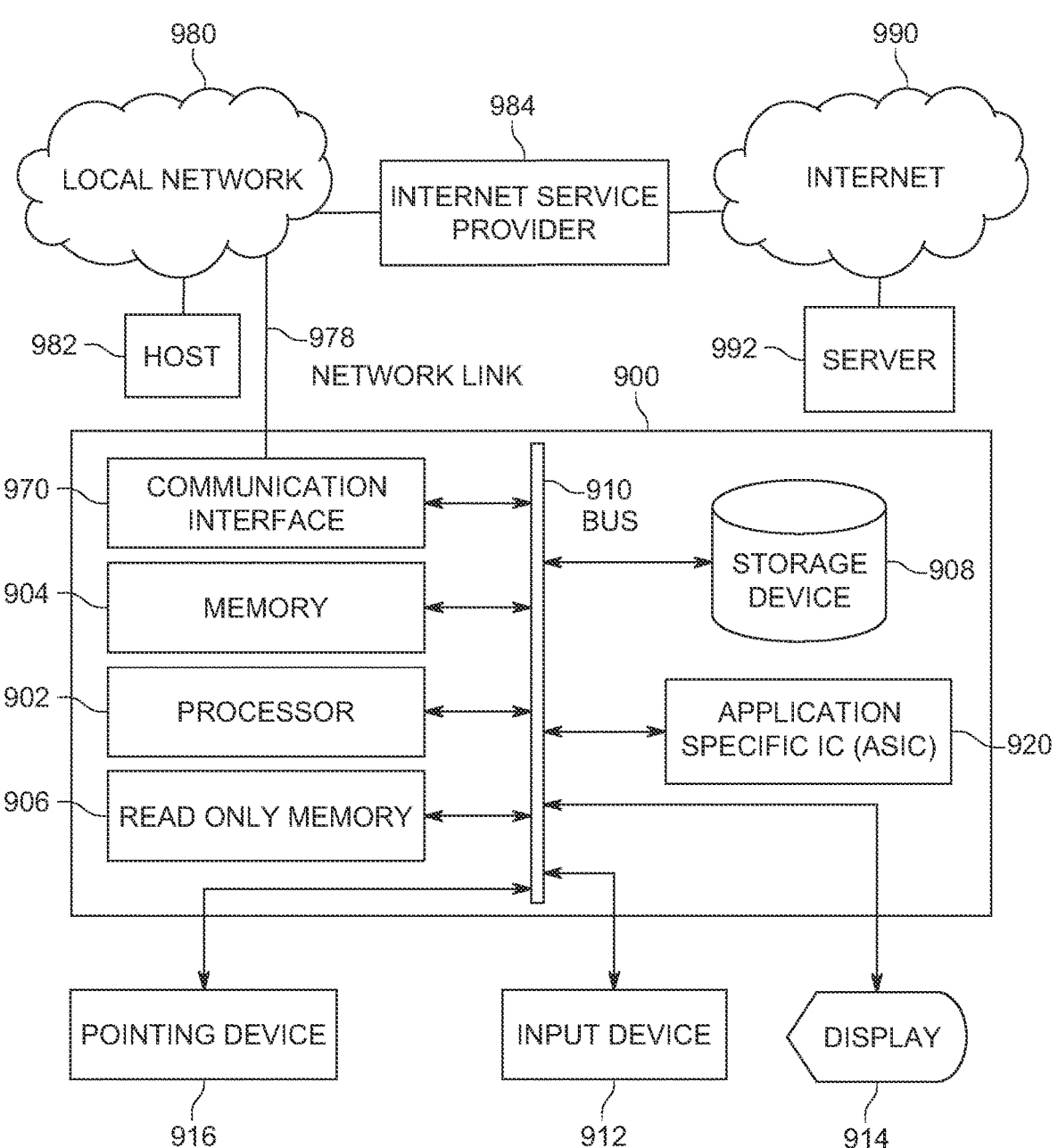
FIG. 9 is a diagram of hardware that can be used to implement an embodiment.

FIG. 4A is a flowchart of a process 400A for computing and storing the risk index for the entrance or the exit of the area, according to one embodiment. In various embodiments, the mapping platform 121 and/or any of the modules 201-207 may perform one or more portions of the process 400 and may be implemented in, for instance, a chip set including a processor and a memory as shown in FIG. 9. As such, the mapping platform 121 and/or any of the modules 201-207 may provide means for accomplishing various parts of the process 400A, as well as means for accomplishing embodiments of other processes described herein in conjunction with other components of the system 100. Although the process 400A is illustrated and described as a sequence of steps, it is contemplated that various embodiments of the process 400A may be performed in any order or combination and need not include all of the illustrated steps.

In step 401, the historical probe data may be acquired from one or more devices in the area. The historical probe data may be associated with the area, such as the parking lot 305. The historical probe data may include data associated with a distribution of vehicles entering or leaving the area in a given time partition. In some embodiments, the one or more devices may be associated with the vehicles entering or exiting out of the area. Examples of the one or more devices may include, but are not limited to, embedded or integrated navigation system, advanced driver assistance system (ADAS) and a mobile device associated with the driver in driving mode.

The historical probe data may include a latitude, a longitude and a timestamp associated with the vehicles entering or leaving the area in the given time partition. In some embodiments, the historical probe data may include speed and heading, and altitude associated with the vehicles entering or leaving the area in the given time partition. The one or more devices may record a trip made by the vehicles entering or leaving the area with timestamps associating coordinates of the location (such as the area) with a time at the location. Moreover, location data from the vehicles, either collected from the vehicles or from the mobile devices traveling within the vehicles, generally includes the location data reflecting driven paths, that may ultimately reveal the location of traversed entrances and exits, as well as the times when the entrances and exits were traversed. Such historical probe data acquired from the one or more devices may thus, include data associated with the distribution of vehicles entering or leaving the area in the given time partition. For example, for a given building exit, such as the exit 309, the system 100 may detect that a majority of the vehicles exit the building between a given time, such as between 8 AM and 9 AM. In some embodiments, the mapping platform 121 may further acquire data from automatic plate reader (ANPR) system, traffic cameras, surveillance cameras, observations by other vehicles and the like in addition to the historical probe data.

In some embodiments, the given time period comprises at least one of a time of day, a time of week, a time of season, a time of year, or a combination thereof. For example, the system 100 may estimate the distribution of the vehicles entering or leaving the area in a specific time of the day (such as between 8 AM and 9 AM). In another example, the system 100 may estimate the distribution of the vehicles entering or leaving the area per hour or per 15 minutes slot. Further, based on information related to the area (such as the parking area 305), the number of vehicles inside the parking lot or the maximum capacity of the parking lot, the system 100 may estimate a likelihood of the vehicle leaving the parking area 305. In an exemplary scenario, the parking area 305 may be a small space with the maximum capacity of 20 cars and 16 cars may have left the parking area 305 till 9 AM that may be a peak time for the vehicles to exit. In such a case, the likelihood of exit of another vehicle after 9 AM would be small. The system 100 may similarly, estimate the distribution of the vehicles for the time of the year, the time of season (such as a summer season), or the combination thereof.

In step 403, the map feature data associated with at least one of the entrance or the exit of the area may be obtained from the geographical database 125. For example, the map feature data associated with the exit 309 of the parking area 305 may be obtained from the geographical database 125. The map feature data may include data associated with one or more physical objects in vicinity of the area, such as the parking area 305.

In one or more embodiments, the physical objects include at least a sidewalk, a street furniture, a pedestrian (such as the user), bicycle lane or a bicycle path and a public transport stop. The street furniture may include, for example, streetlights, advertisement banners, trees, traffic lights, road signs, benches, and electric poles. The map feature data may include one or more of geometrical data, a directionality parameter, and a street feature, or a combination thereof. The geometrical data may be associated with the surroundings of the area, such as the parking area 305 as obtained from the geographical database 125. The surroundings of the area may include the one or more of the physical objects in the vicinity of the area. The geometrical data may include information such as a physical geometry of the physical objects, a size of the sidewalk, a population or pedestrian density on the street outside the area, such as the parking area 305. The geometrical data may further include information about proximity of the parking area 305 to the public transport stop. The directionality parameter may indicate a visibility of the entrance or the exit of the parking area 305 from different directions. For example, the visibility of the entrance or the exit of the parking area 305 for the pedestrian travelling from North to South may be more than the visibility of the parking area 305 for the pedestrian travelling from the opposite direction. The street feature may include information about the street furniture blocking a line of sight of the entrance or the exit of the parking area 305.

In step 405, the risk index for the at least one of the entrance or the exit of the area may be computed for the given time partition, based on the historical probe data and the map feature data for the at least one of the entrance or the exit of the area. The risk index indicates a probability of occurrence of a hazard in the vicinity of the at least one of the entrance or the exit of the area. The risk index may be a value between 0 and 1. Higher the value of the risk index, higher the probability of occurrence of the hazard. For example, the risk index may be 0.8 for the parking area 305.

Such a value may indicate that the probability of occurrence of the hazard is high for the parking area 305.

In an embodiment, the risk index for the area may change based on the given time period. For example, the time period 8 AM to 9 AM may be the peak time for the parking area 305. During the time period 8 AM to 9 AM, the risk index may be 0.9. Furthermore, the risk index during off-peak time, such as 3 PM to 4 PM may be 0.3. Such risk indices may indicate that the probability of occurrence of the hazard in the vicinity of the parking area 305 during time period 8 AM to 9 AM may be more as compared to the time period 3 PM to 4 PM.

In some embodiments, a line of sight (LOS) data associated with the at least one of the entrance or the exit of the area may be obtained from the geographical database 125. The LOS may be critical for both the user, such as the pedestrian, and the driver of the vehicle exiting out of the parking area 305. When the LOS is good, the risk of occurrence of the hazard may be limited, as both the pedestrian and the driver may identify each other without surprising one another. The LOS data may include 3D representations of the entrance or the exit 307 of the parking area 305. The system 100 may obtain the LOS data from the geographical database 125. By use of the obtained LOS data, the LOS may be computed. The LOS data may further be utilized for computation of the risk index.

In some embodiments, a geolocated event data may be determined. The geolocated event data may include at least one of an accident event data or an emergency event data. For example, the accident event data may include a rate of occurrence of accident, or a number of accidents reported in the vicinity of the parking area 305. The emergency event data may include information about usage of emergency braking in the vicinity of the parking area 305 and evasive maneuvers in the vicinity of the parking area 305. The geolocated event data may further be utilized to compute the risk index.

In some embodiments, computing the risk index for the at least one of the entrance or the exit of the area for the given time partition, based on the historical probe data and the map feature data, further includes application of the historical probe data and the map feature data to a trained machine learning model (such as the machine learning system 123). In some embodiments, the geolocated event data may further be applied to the machine learning system 123 for computing the risk index. The computing of the risk index further includes computing a prediction output data using the trained machine learning model, the prediction output data being associated with the risk index. Details of the computation of the risk index are further provided, for example, in FIG. 4B.

Figure 4B:
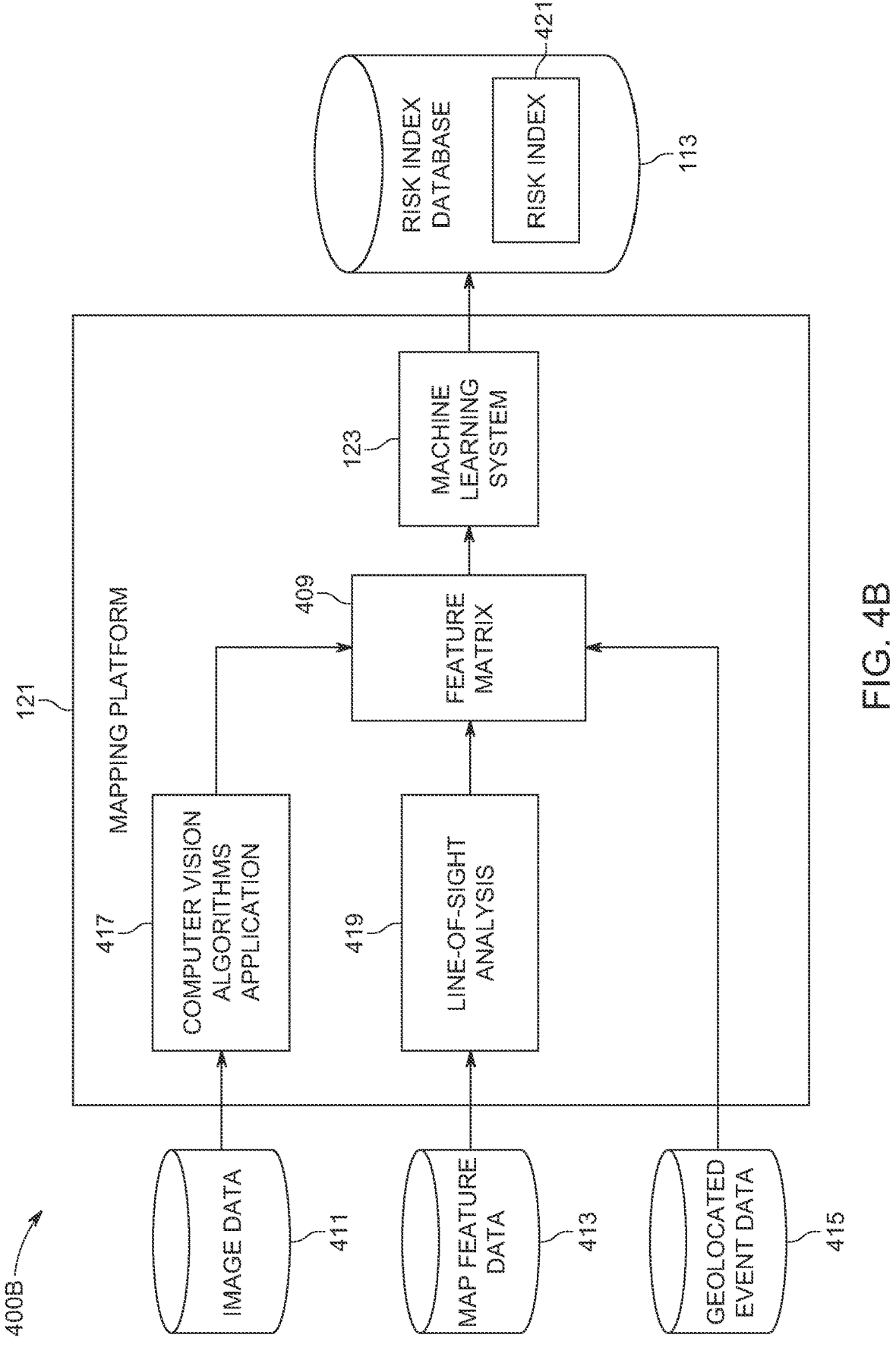
FIG. 4B is a block diagram for computing the risk index by use of a machine learning system, according to one embodiment.

FIG. 4B is a block diagram 400B for computing the risk index by use of the machine learning system 123, according to one embodiment. The machine learning system 123 may receive a feature matrix 409 as an input to output the prediction output data. The feature matrix 409 may be generated based on for example, image data 411 from the geographical database 125, map feature data 413 and geolocated event data 415. The image data 411, the map feature data 413 and the geolocated event data 415 may be received by the mapping platform 121 to generate the feature matrix 409. For example, the image data 411 from the geographical database 125 and the map feature data 413 received from the one or more devices or the geographical database 125 may be utilized to identify observed obstructions in front of the entrance or the exit of the parking area 305. The image data 411 may further be utilized to estimate the distribution of the vehicles in the parking area 305 in the given time partition. In an exemplary scenario, the mapping platform 121 may perform computer vision algorithms application 417 on the image data 411 to determine features for the feature matrix. The computer vision algorithms may be for example, You Only Look Once (YOLO) Real Time Object Detection Algorithm or Region-Based Convolutional Neural Network (R-CNN). Further, segmentation techniques may be utilized to identify a contrast between a segment in the image data 411 containing the entrance or the exit of the parking area 305 and adjacent segments in the image data 411 exclusive of the entrance or the exit of the parking area 305. The computer vision algorithms and the segmentation techniques may be utilized to obtain the features from the image data 411, such as the features associated with the contrast or visibility of the entrance or the exit of the parking area 305, for the feature matrix 409.

The computer vision algorithms may process a set of pixels of the image data 411 to extract one or more attributes from the image data 411. For example, the one or more attributes may include a size of the physical objects, a width of the physical objects, shapes of the physical objects, volumes of the physical objects, a color of the of the physical objects, a texture of the of the physical objects, contrast between the physical objects and walls of the entrance or exit, a type of the road and walls of the entrance or exit, an angle and orientation of the physical objects, and the like. Such one or more attributes may be utilized to generate the feature matrix.

Furthermore, the map feature data 413 may be utilized to determine the one or more physical objects that may be blocking a view of the entrance or the exit of the parking area 305, for the user, such as the pedestrian. The one or more physical objects may be three-dimensional (3D) objects blocking the view of the entrance or the exit of the parking area 305. For example, the mapping platform 121 may perform a Line-Of-Sight analysis 419 on the 3D objects in the map feature data 413 to determine the objects that may significantly block the view of the entrance or the exit of the parking area 305. In an example, a vantage point may be selected at a middle of the entrance or the exit of the parking area 305 and the 3D objects that may be within (for example, a range of 10 to 20 meters) and may occlude the view of the entrance or the exit of the parking area 305 may be identified. The identified 3D objects may be utilized to generate the feature matrix 409. Such an identification may be performed by use of 3D rendering engines (for example, Unreal Engine). In one embodiment, the machine learning system 123 of the mapping platform 121 may be utilized to perform image segmentation to identify the obstructions, such as the 3D objects in front of the entrance or the exit of the parking area 305. For example, to perform image segmentation, the machine learning system 123 may use a Mask R-CNN or equivalent as an example implementation of image segmentation deep learning network. The Mask R-CNN, for instance, enables image segmentation of input images so that individual pixels or groups of pixels of the input image may be classified into semantic categories corresponding instances of the types of obstructions, such as due to the street furniture.

Moreover, the geolocated event data 415 may be utilized to label the entrance or the exit of the parking area 305 and to generate the feature matrix 409, based on the rate of occurrence of accident, or the number of accidents reported in the vicinity of the parking area 305. In some embodiments, the feature matrix 409 may include, but may not be limited to, a width of the street associated with the entrance or the exit of the parking area 305, a width of the sidewalk associated with the entrance or the exit of the parking area 305, a presence or absence of the bike lane near the entrance or the exit of the parking area 305, a width of the bike lane associated with the entrance or the exit of the parking area 305, a closest point of interest associated with the entrance or the exit of the parking area 305, the point of interest within a certain range of distance (for example, 100 meters) from the entrance or the exit of the parking area 305, the number of lanes near the entrance or the exit of the parking area 305, a speed limit of the road associated with the entrance or the exit of the parking area 305, a presence or absence of the road sign indicating the entrance or the exit of the parking area 305, a presence of parking lanes on the link, a size of the parking area 305, a number of lanes to the parking area 305, the number of lanes from the parking area 305, a presence of vegetation on the sidewalk, a surface of the road associated with the entrance or the exit of the parking area 305, a change in surface of the road in front of the entrance or the exit of the parking area 305, a height of the parking area 305, a presence of a gate in front of the entrance or the exit of the parking area 305, or accessibility of the parking area 305 for firemen. Such feature matrix 409 may be generated for each entrance and exit of each parking area, such as the parking area 305.

The generated feature matrix 409 may be provided as the input to the machine learning system 123. The machine learning system 123 may output risk index 421 computed for the area, such as the entrance or the exit of the parking area 305. The machine learning system 123 may compute the prediction output data based on the risk index 421 computed for the area, such as the parking area 305. For example, in case, a large tree is detected outside the exit 307 of the parking area 305, the visibility of the exit 307 for the pedestrian may be low. In such a case, the prediction output data may include the risk index as high. In another example, based on the distribution of the vehicles in the parking area 305 in the given time partition, the machine learning system 123 may compute the prediction output data.

In some embodiments, computing the prediction output data from the trained machine learning model (such as the machine learning system 123) further includes generating a label value for the at least one of the entrance or the exit 307 of the area, such as the parking area 305 based on the computed risk index, such that similar entrances or exits in a dataset of a plurality of entrances or exits are given the same label value. The similarity of the entrances or exits may be identified based on the map associated with the corresponding entrances and exits. For example, the label value for the entrance or the exit 307 of the parking area 305 may be generated. Based on the label value, the entrance or the exit 307 of the parking area 305 may be classified as one of a high-risk area, a medium-risk area, or a low-risk area. The generated label value for the entrance or the exit 307 may further differ based on the given time partition. In an exemplary scenario, the high-risk area corresponds to the risk index between 0.7 to 1. The medium-risk area corresponds to the risk index between 0.4 to 0.6. The low-risk area corresponds to the risk index between 0 and 0.3. The generated label value may be based on the distribution of the vehicles in the parking area 305 and the physical objects in the vicinity of the parking area 305 that may block the entrance or the exit 307 of the parking area 305. The machine learning system 123 may give a same label value for the similar entrances or exits in the dataset of the plurality of entrances or exits, based on the map feature data.

In some embodiments, the machine learning model (such as the machine learning system 123) is trained using one or more training datasets including at least one of the historical probe data, the LOS data, the map feature data, the geolocated event data, and 3D point cloud data obtained from one or more sensors of one or more probe vehicles in vicinity of the area; or a combination thereof.

The LOS data may include the images of the parking area 305 from different perspectives. The map feature data may include the geometric data associated with the surroundings of the parking area 305, the directionality parameter, the street feature, or the combination thereof. The geolocated event data may include the accident event data or the emergency event data. The 3D point cloud data may include the map representation of the parking area 305 and the physical objects, including the pedestrians outside the entrance or the exit 307 of the parking area 305. The LOS data, the map feature data, the geolocated event data and the 3D point cloud data may be provided to the machine learning model as an input for the training of the machine learning model.

In an embodiment, the feature matrix corresponding to the entrance and exit of different parking areas may be utilized to generate the one or more training datasets to train the machine learning system 123. For example, the machine learning system 123 may be trained by use of supervised learning. In such a case, along with the feature matrix, each of the entrance and exit of different parking areas may be labelled as either a good visibility entrance or the exit, or a bad visibility entrance or the exit for the supervised learning. Moreover, the geolocated event data associated with the entrance and exit of different parking areas may be utilized to generate insights corresponding to the entrance and exit of different parking areas. For example, the generated insight may indicate that the parking areas or the garages whose entrances has an angle of "X" degrees (eg. 90 degrees) with the street are more likely to cause accidents. In another example, the generated insight may indicate that the parking areas with a different color of a wall of the entrance as compared to the color of the street is less likely to cause accidents. Such generated insights may be utilized to train the machine learning system 123.

The feature matrix along with the labelled entrance and exit of different parking areas may be used as ground truth data for the training of the machine learning system 123. The trained machine learning system 123 may utilize the ground truth data for output of the risk index associated with the entrance or the exit of the parking area 305. The trained machine learning system 123 may compare the feature matrix and the labelled entrances and exits included in the ground truth data with the entrance or the exit of the parking area 305 to compute the risk index of the entrance or the exit of the parking area 305. Examples of the machine learning system 123 for computation of the risk index may include, but may not be limited to, regression-based models or classification based models, such as logistic regression model, linear regression model, decision trees based model, relevance vector machines (RVM), and support vector machines (SVM).

In some embodiments, the method further includes generation of a notification signal based on the computed risk index. The generation of the notification signal further includes providing data for generating a navigation instruction for recommending an alternate route for navigation, such that the alternate route is associated with a lower risk index value than the computed risk index. Details of the generation of the notification signal are further provided, for example, in FIG. 5.

In some embodiments, the method further includes providing data for generating a warning when the risk index is greater than a first threshold value. Further, the method may include providing data for issuing a warning on a user interface device when the risk index is greater than the first threshold value. The user interface may be associated with the user equipment 115. The user interface may allow for conveying the warning via audible signals, haptic signals, or any other user interface channel available to the user equipment 115. Details of the generation of the warning are further provided, for example, in FIG. 5.

In some embodiments, the method further includes providing data for generating a mapping user interface that presents a representation of the risk index. Details of the mapping user interface are further provided, for example, in FIG. 6.

Referring again to FIG. 4A, in step 407, the risk index 421 may be stored as an attribute of the at least one of the entrance or the exit of the area in the geographic database 125. In an embodiment, the risk index 421 may be stored in the risk index database 113. The risk index 421 associated with the entrance or the exit 307 of the parking area 305 may be different for different time partitions. For example, the risk index 421 associated with the entrance or the exit 307 between 8 AM and 10 AM may be 0.7. The risk index 421 associated with the entrance or the exit 307 on weekends may be 0.4. The risk index 421 associated with the entrance or the exit 307 during a rainy day may be 0.2. Such computed risk indices may be stored in the geographic database 125 or the risk index database 113.

Figure 5:
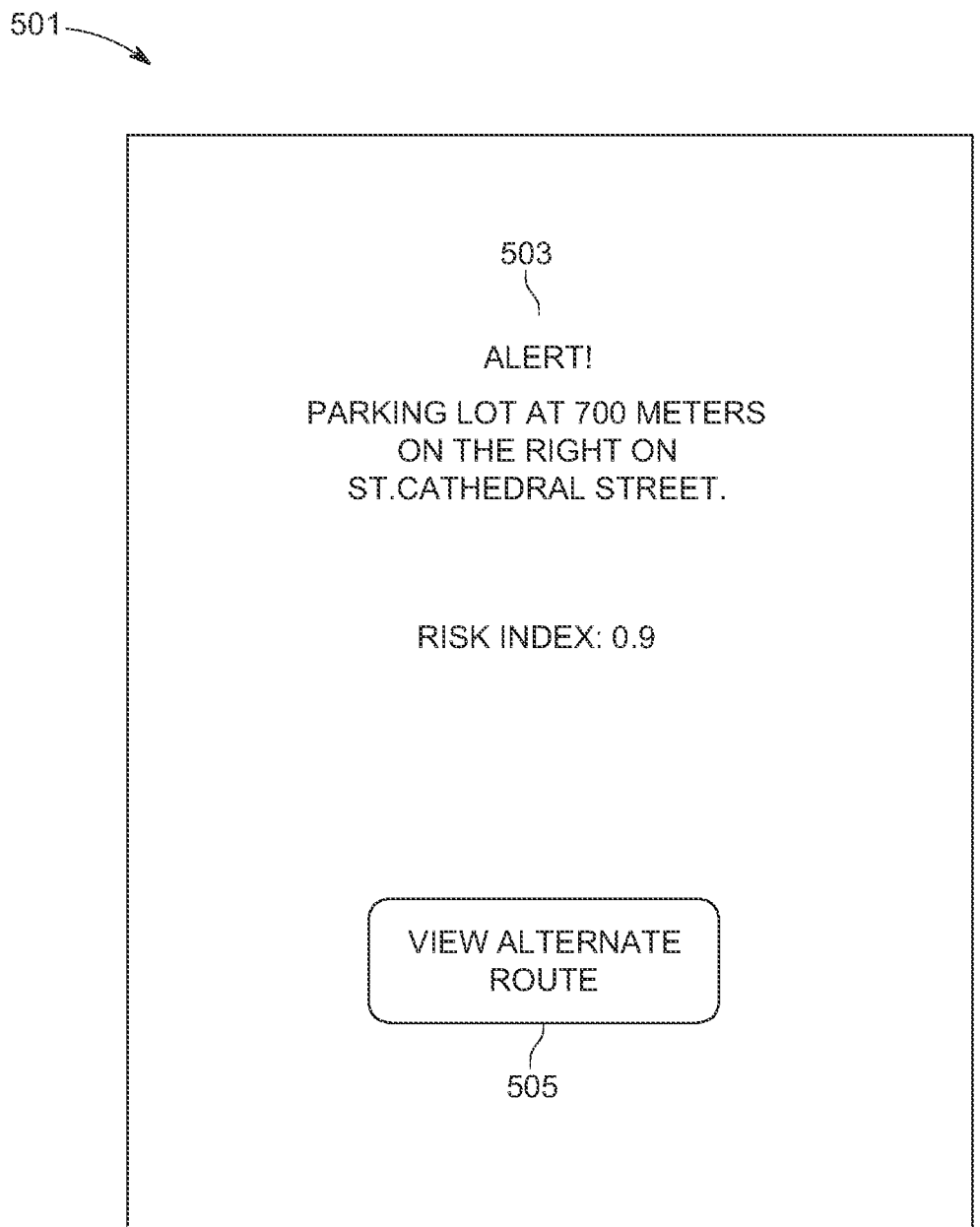
FIG. 5 is a diagram illustrating a displayed warning on a user interface, according to one embodiment.

FIG. 5 is a diagram illustrating a displayed warning on a user interface device 501, according to one embodiment. The user interface device 501 may be associated with the user, such as the pedestrian or the user of the micro mobility vehicle passing by the street. In some embodiments, the user interface device 501 may be a part of the user equipment 115, such as a mobile phone of the pedestrian, the micro mobility vehicle used by the user, or an electronic scooter used by the user.

In some embodiments, the system 101 may provide data for generating a warning 503 when the risk index is greater than a first threshold value. For example, the first threshold value may be 0.7. The first threshold value may be indicative of a high risk associated with the exit of the area. In such a case, the warning 503 may be generated for the user. The system 101 may further provide data for displaying the warning 503 on the user interface device 501 when the risk index 421 is greater than the first threshold value. For example, the risk index 421 is 0.9 that is greater than the first threshold value of 0.7. Thus, the system 101 may display the warning 503 on the user interface device 501. In an exemplary scenario, the system 101 may display the warning 503 depicting that the parling lot has the risk index 421 of 0.9 to alert the user.

In some embodiments, the system 101 may generate a notification signal based on the computed risk index 421. For example, the generated notification signal may be a textual notification, an audio notification, or a haptic notification. Further, the generation of the notification signal may further include providing data for generating a navigation instruction 505 for recommending an alternate route for navigation, such that the alternate route is associated with a lower risk index value than the computed risk index 421. The system 101 may provide the navigation instruction 505 via the user interface device 501 that may be utilized by the user to follow the alternate route associated with the lower risk index value than the computed risk index 421.

In one or more embodiments, the user interface device 501 may be an augmented reality (AR) device, such as AR glasses. The generated warning 503 and the navigation instruction 505 may be viewed by the user via the AR glasses worn by the user. In an embodiment, the warning 503 and the navigation instruction 505 may be provided to the user in a scenario, when a speed associated with the user, such as the speed of the micro mobility vehicle may be greater than a threshold speed. For example, the threshold speed may be 10 to 15 miles per hour.

Figure 6:
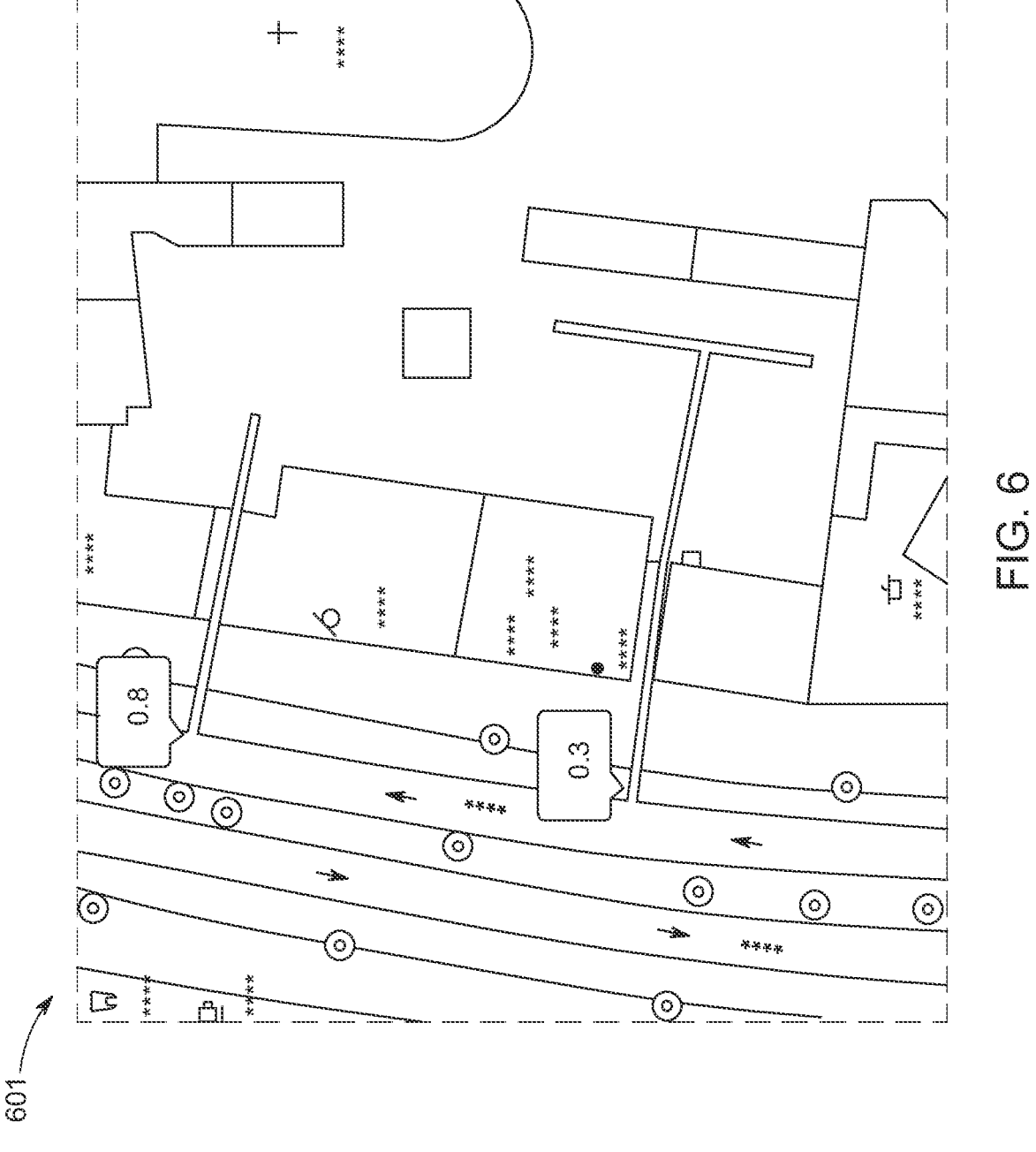
FIG. 6 is a diagram illustrating a mapping user interface, according to one embodiment.

FIG. 6 is a diagram illustrating a mapping user interface 601, according to one embodiment. The mapping user interface 601 may be viewed by the user via the user interface device 501.

In some embodiments, the system 101 may provide data for generating the mapping user interface 601 that presents a representation of the risk index 421. The mapping user interface 601 may include a dedicated map layer including risky garage exits and the related time partition when the risk index 421 may be high. For example, the mapping user interface 601 may display a route of travel for the user. The route of travel may include one or more areas, such as the parking areas, the garages, and the like that may be hidden. The dedicated map layer includes the risky garage exits for the user. The mapping user interface 601 may further display the risk index 421 associated with the risky garage exits based on the time of travel of the user. The mapping user interface 601 may be utilized by the user to decide a safe route of travel for the user.

Figure 7:
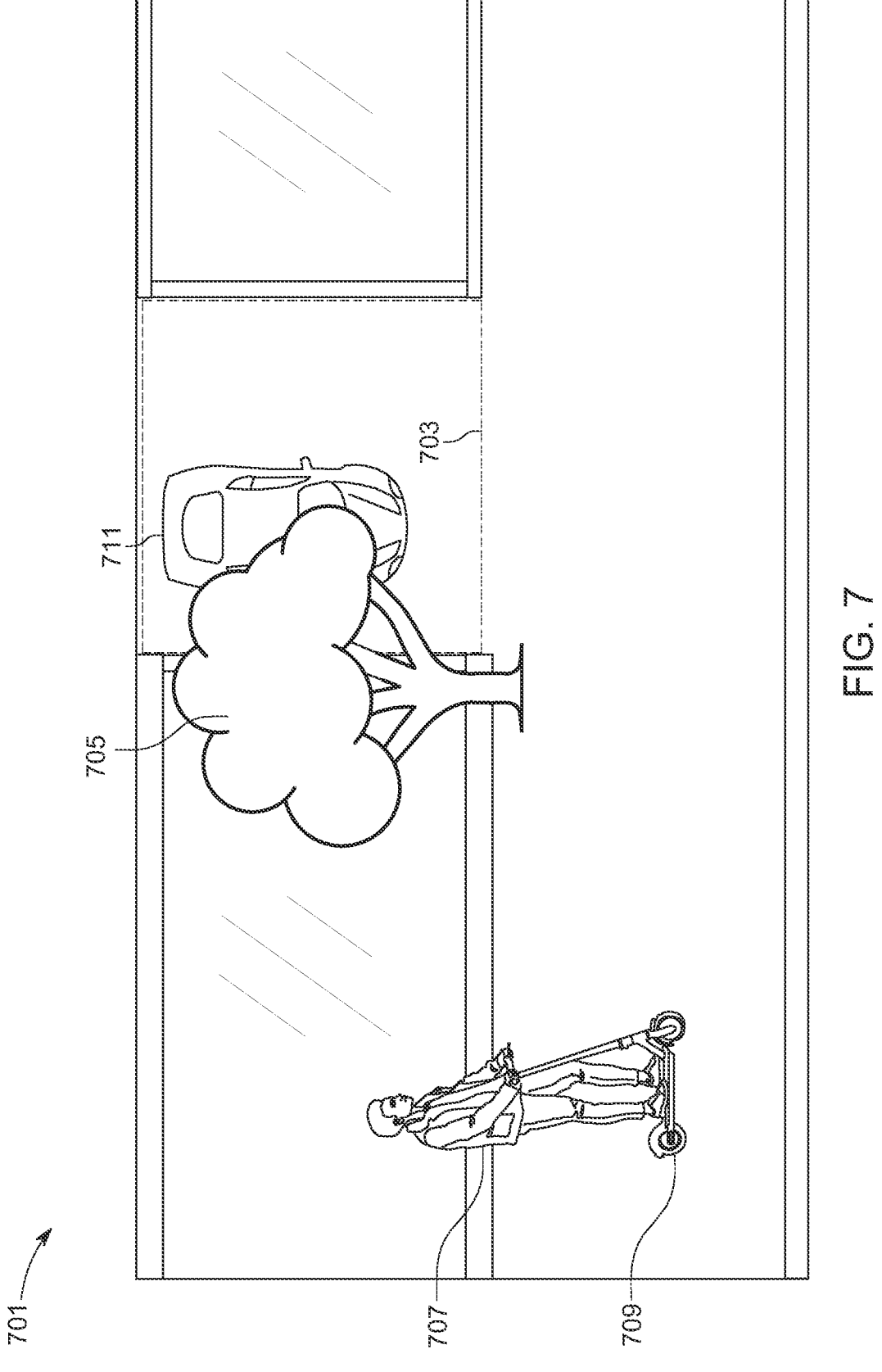
FIG. 7 is a diagram illustrating an exemplary scenario of a parking lot exit concealed by a physical object, according to one embodiment.

FIG. 7 is a diagram illustrating an exemplary scenario 701 of a parking lot exit 703 concealed by a physical object 705, according to one embodiment. The exemplary scenario 701 may further include a user 707 travelling via a micro mobility vehicle 709, such as a Segway.

In an exemplary scenario, the user 707 may be travelling on a street on the mobility vehicle 709. The parking lot exit 703 may be between two buildings. Furthermore, the parking lot exit 703 may be concealed or hidden due to the presence of the physical object 705, such as a tree besides the parking lot exit 703. Moreover, a vehicle 711 may be exiting out from the parking lot exit 703. It is noted that the vehicle 711 may also not be exiting the parking lot exit 703, yet due to the lack of visibility there is still an uncertainty about any vehicle leaving parking lot exit 703. Due to the buildings on both sides of the parking lot a driver of the vehicle 711 may have an obstructed view of the street, thereby making it difficult for the driver of the vehicle 711 to perceive the user 707 on the micro mobility vehicle 709. In the case of an autonomous vehicle (AV), the same obstructed view may cause issues for the AV to detect the user 707.

The system 101 may in such a case, warn the user 707 on the micro mobility vehicle 709 early enough to detect the parking lot exit 703. The time at which the warning may be provided may be based on the speed of the micro mobility vehicle 709 and the risk index of the parking lot exit 703. The system 101 may provide a real-time warning to the user 707 about the high-risk parking lot exit 703 on a right side of the street. The warning may be in a form of the alert or the notification signal. In some embodiments, the mapping user interface 601 may be utilized by the user 707 to detect the high-risk parking lot exit 703. In some embodiments, the warnings may be displayed on the user interface device of the micro mobility vehicle 709, or the mobile phone associated with the user 707.

In an embodiment, the system 101 may provide the warnings associated with a number of users, such as the pedestrians on the street to the driver of the vehicle 711 exiting out from the parking lot exit 703. Thus, the driver of the vehicle 711 may be warned about the user in vicinity of the parking lot exit 703.

Returning to FIG. 1, as shown, the system 100 includes the mapping platform 121 for computing and storing the risk index for the entrance or the exit of the area, such as the parking lot 101. The system 100 may further include sensor data 111, a user equipment (UE) 115, an application 117, a communication network 119, the mapping platform 121, a risk index database 113 and a geographical database 125. The mapping platform 121 may further include a machine learning system 123. In some embodiments, the risk index database 113 may be a part of the geographical database 125. The system 100 may further include a services platform 127. The services platform 127 may include one or more services 129. The system 100 may further include content providers 131, such as a content provider 131a and a content provider 131m.

In one embodiment, the mapping platform 121 has connectivity over the communication network 119 to the services platform 127 that provides the one or more services 129 that can use the risk index database 113 for downstream functions. By way of example, the services 129 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 129 uses the output of the mapping platform 121 (e.g., the risk index stored in the risk index database 113, the maps stored in the geographic database 125, etc.) to provide services such as navigation, mapping, other location-based services, etc. to the vehicle 109, the UE 115, the applications 117, and/or other client devices.

In one embodiment, the mapping platform 121 may be a platform with multiple interconnected components. The mapping platform 121 may include multiple servers, intelligent networking devices, computing devices, components, and corresponding software for computation of the risk index according to the various embodiments described herein. In addition, it is noted that the mapping platform 121 may be a separate entity of the system 100, a part of the one or more services 129, a part of the services platform 127, or included within components of the vehicle 109 and/or UEs 115.

In one embodiment, the content providers 131 may provide content or data (e.g., including the sensor data 111 such as image data, probe data, related geographic data, etc.) to the geographic database 125, machine learning system 123, the mapping platform 121, the services platform 127, the services 129, the vehicle 109, the UE 115, and/or the applications 117 executing on the UE 115. The content provided may be any type of content, such as sensor data, imagery, probe data, machine learning models, permutations matrices, map embeddings, map content, textual content, audio content, video content, image content, etc. In one embodiment, the content providers 131 may provide content that may aid in computation of the risk index according to the various embodiments described herein. In one embodiment, the content providers 131 may also store content associated with the geographic database 125, mapping platform 121, services platform 127, services 129, and/or any other component of the system 100. In another embodiment, the content providers 131 may manage access to a central repository of data, and offer a consistent, standard interface to data, such as a repository of the geographic database 125.

In one embodiment, the vehicle 109 and/or UE 115 may execute software applications 117 to use the risk index or other data derived therefrom according to the embodiments described herein. By way of example, the applications 117 may also be any type of application that is executable on the vehicle 109 and/or UE 115, such as autonomous driving applications, routing applications, mapping applications, location-based service applications, navigation applications, device control applications, content provisioning services, camera/imaging application, media player applications, social networking applications, calendar applications, and the like. In one embodiment, the applications 117 may function as a client for the mapping platform 121 and perform one or more functions associated with computation of the risk index alone or in combination with the mapping platform 121.

By way of example, the vehicle 109 and/or the UE 115 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicle 109 and/or the UE 115 can support any type of interface to the user (such as "wearable" circuitry, etc.). In one embodiment, the vehicle 109 and/or the UE 115 may be associated with or be a component of a vehicle or any other device.

In one embodiment, the vehicle 109 and/or the UE 115 are configured with various sensors for generating or collecting the sensor data 111 (e.g., image data, probe data), related geographic data, etc. In one embodiment, the sensed data represent sensor data associated with a geographic location or coordinates at which the sensor data was collected, and the polyline or polygonal representations of detected objects of interest derived therefrom to generate the digital map data of the geographic database 125. By way of example, the sensors may include a global positioning sensor for gathering location data (e.g., GPS, GALILEO, BEIDOU, GLONASS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicle 109 and/or the UE 115 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the vehicle 109 and/or the UE 115 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 109 and/or the UE 115 may include GPS or other satellite-based receivers to obtain geographic coordinates from positioning satellites for determining current location and time. Further, the location can be determined by visual odometry, triangulation systems such as A-GP S, Cell of Origin, or other location extrapolation technologies.

In one embodiment, the communication network 119 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 121, the services platform 127, the services 129, the vehicle 109 and/or the UE 115, and/or the content providers 131 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
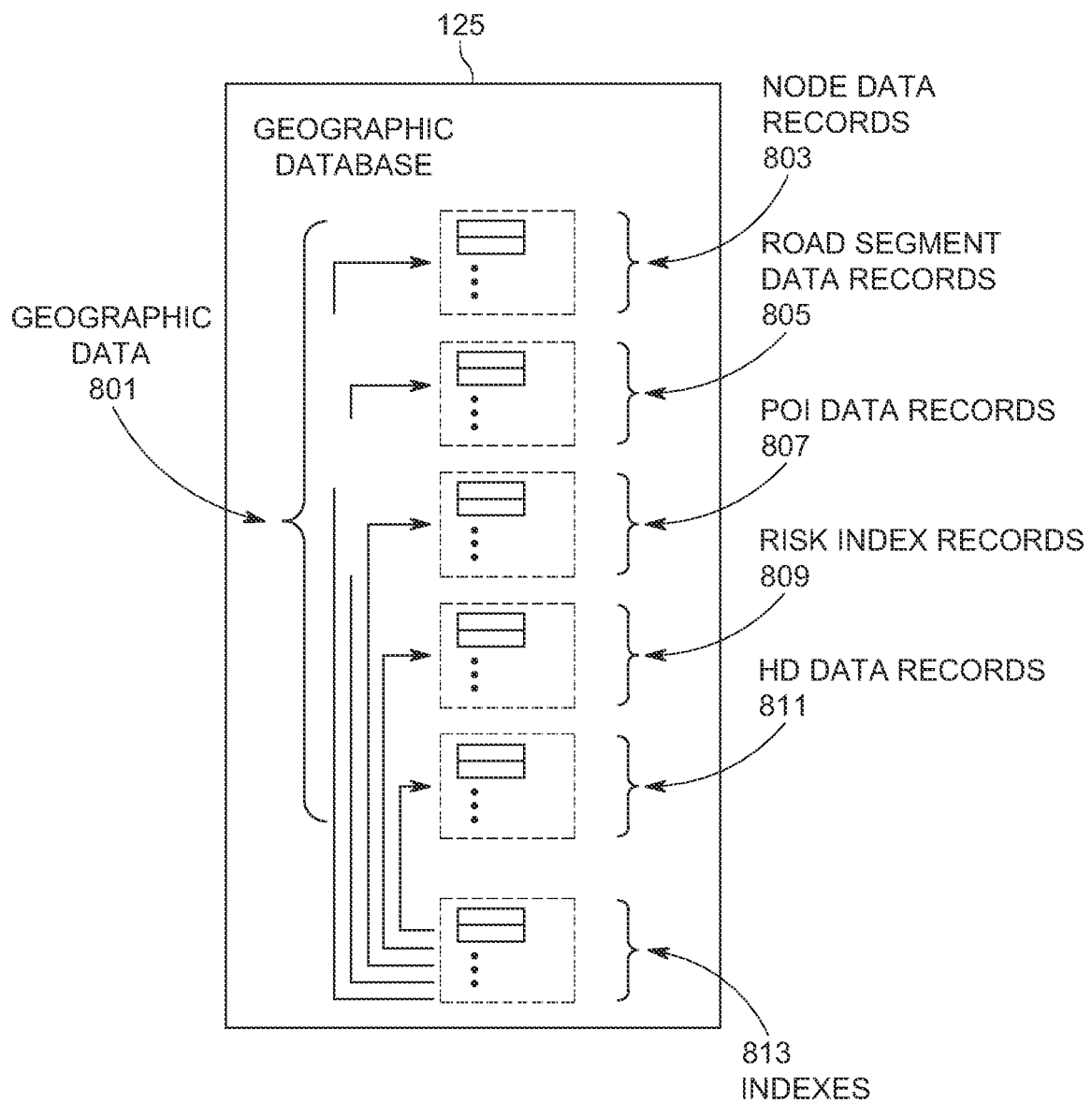
FIG. 8 is a diagram of a geographic database, according to one embodiment.

FIG. 8 is a diagram of the geographic database 125, according to one embodiment. In one embodiment, the geographic database 125 includes geographic data 801 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 801. In one embodiment, the geographic database 125 include high definition (HD) mapping data that provide centimeter-level or better accuracy of map features. For example, the geographic database 125 can be based on Light Detection and Ranging (LiDAR) or equivalent technology to collect billions of 3D points and model road surfaces and other map features down to the number lanes and their widths. In one embodiment, the HD mapping data (e.g., HD data records 811) and/or other mapping data of the geographic database 125 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 125.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, links do not cross themselves and do not cross each other except at a node. Also, there are no duplicated shape points, nodes, or links. Two links that connect each other have a common node. In the geographic database 125, overlapping geographic features are represented by overlapping polygons. When polygons overlap, the boundary of one polygon crosses the boundary of the other polygon. In the geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 125 includes node data records 803, road segment or link data records 805, POI data records 807, risk index records 809, HD mapping data records 811, and indexes 813, for example. More, fewer, or different data records can be provided. In some embodiments, the risk index records may be stored in the risk index database 113. In one embodiment, additional data records (not shown) can include cartographic ("carto") data records, routing data, and maneuver data. In one embodiment, the indexes 813 may improve the speed of data retrieval operations in the geographic database 125. In one embodiment, the indexes 813 may be used to quickly locate data without having to search every row in the geographic database 125 every time it is accessed. For example, in one embodiment, the indexes 813 can be a spatial index of the polygon points associated with stored feature polygons. In one or more embodiments, data of a data record may be attributes of another data record.

In exemplary embodiments, the road segment data records 805 are links or segments representing roads, streets, paths, or bicycle lanes, as can be used in the calculated route or recorded route information for determination of speed profile data. The node data records 803 are end points (for example, representing intersections or an end of a road) corresponding to the respective links or segments of the road segment data records 805. The road link data records 805 and the node data records 803 represent a road network, such as used by vehicles, cars, and/or other entities. Alternatively, the geographic database 125 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 807. The geographic database 125 can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or map feature data can be part of the POI data records 807 or can be associated with POIs or POI data records 807 (such as a data point used for displaying or representing a position of a city).

In one embodiment, the geographic database 125 can also include the risk index records 809 for storing the risk index, street segment definitions (e.g., link IDs and parametric offsets), trained machine learning models, and/or any other related data that is used or generated according to the embodiments described herein. By way of example, the risk index records 809 can be associated with one or more of the node records 803, the road segment records 805, and/or the POI data records 807 to associate the speed profile data records with specific places, POIs, geographic areas, and/or other map features. In this way, the linearized data records can also be associated with the characteristics or metadata of the corresponding records 803, 805, and/or 807.

In one embodiment, as discussed above, the HD mapping data records 811 model road surfaces and other map features to centimeter-level or better accuracy. The HD mapping data records 811 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 811 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 125 can be maintained by the content provider 131 in association with the mapping platform 121 (e.g., a map developer or service provider). The map developer can collect geographic data to generate and enhance the geographic database 125. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 125 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicle 109 and/or the UE 115. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for computation of the risk index may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 9 is a diagram of hardware that can be used to implement an embodiment. Computer system 900 is programmed (e.g., via computer program code or instructions) to compute the risk index based on the historical probe data and the map feature data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to compute the risk index. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

The computer system 900 also includes a memory 904 coupled to bus 910. The memory 904, such as a random access memory (RAM) or other dynamic storage device, stores information including processor instructions for computation of the risk index. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, which is not changed by the computer system 900. Some memory is composed of volatile storage that loses the information stored thereon when power is lost. Also coupled to the bus 910 is a non-volatile (persistent) storage device 908, such as a magnetic disk, optical disk, or flash card, for storing information, including instructions, which persists even when the computer system 900 is turned off or otherwise loses power.

Information, including instructions for computation of the risk index, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to the bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 900 also includes one or more instances of a communications interface 970 coupled to bus 910. The communication interface 970 provides a one-way or two-way communication coupling to a variety of external devices that operate with their own processors, such as printers, scanners, and external disks. In general, the coupling is with a network link 978 that is connected to a local network 980 to which a variety of external devices with their own processors are connected. For example, the communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, the communication interface 970 is a cable modem that converts signals on the bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals, which carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 119 for computation of the risk index.

The term computer-readable medium is used herein to refer to any medium that participates in providing information to processor 902, including instructions for execution. Such a medium may take many forms, including, but not limited to, non-volatile media, volatile media, and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, the network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

Figure 10:
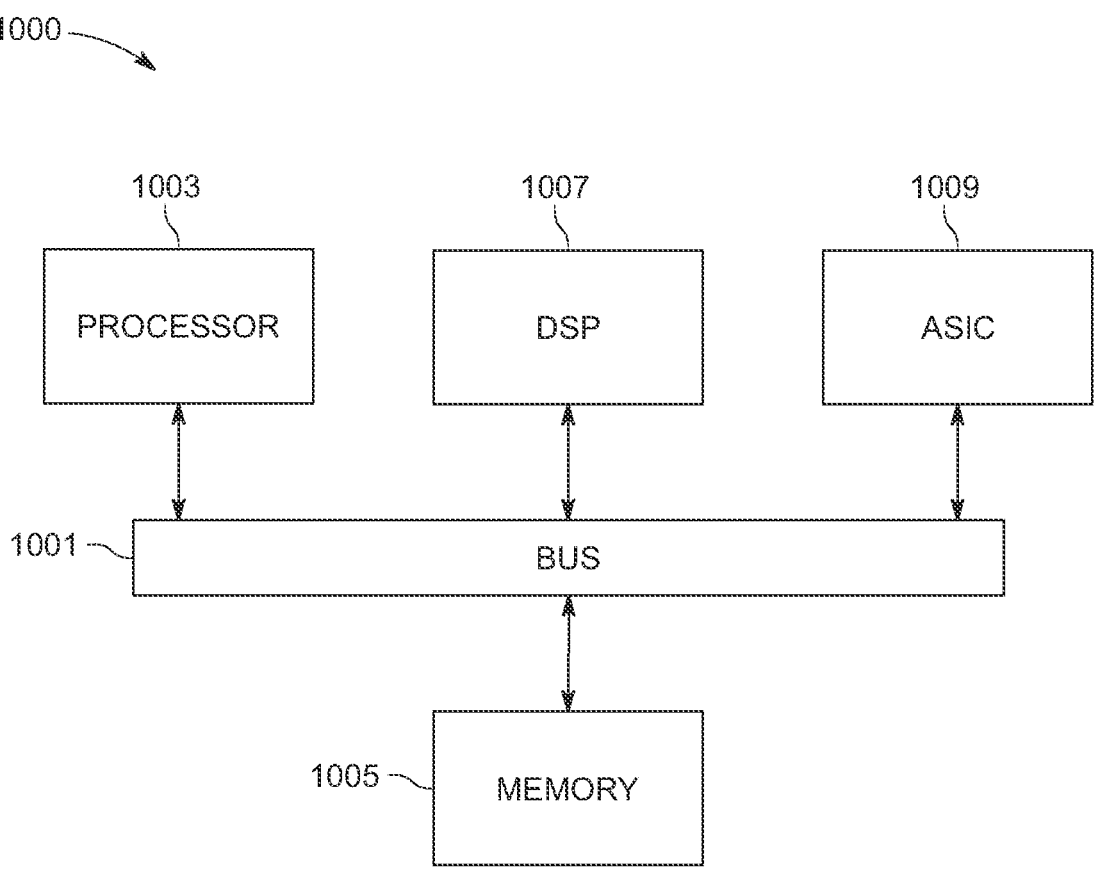
FIG. 10 is a diagram of a chip set that can be used to implement an embodiment.

FIG. 10 is a diagram of a chip set 1000 that can be used to implement an embodiment. The chip set 1000 is programmed to compute the risk index as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to compute the risk index. The memory 1005 also stores the data associated with or generated by the execution of the inventive steps.

Figure 11:
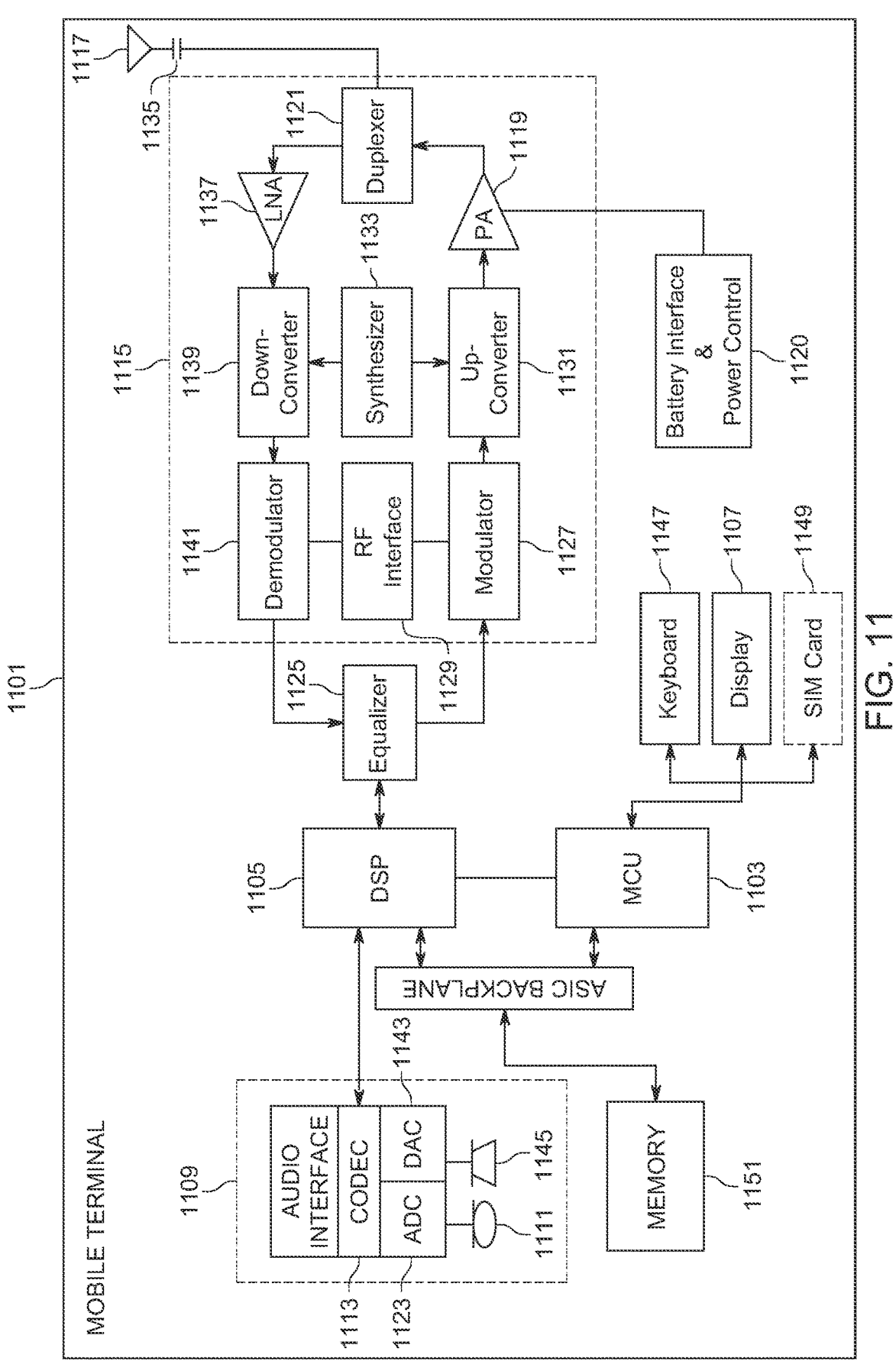
FIG. 11 is a diagram of a mobile terminal (e.g., handset, vehicle, or part thereof) that can be used to implement an embodiment.

FIG. 11 is a diagram of a mobile terminal (e.g., handset, vehicle, or part thereof) that can be used to implement an embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1403—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to compute the risk index. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

acquiring historical probe data associated with an area from one or more devices in the area, wherein the historical probe data comprises data associated with a distribution of vehicles entering or leaving the area in a given time partition;

obtaining map feature data associated with at least one of an entrance or an exit of the area, from a geographical database, wherein the map feature data comprises data associated with one or more physical objects in vicinity of the area;

obtaining line of sight (LOS) data between (a) the entrance and a street or a sidewalk, or (b) the exit and the street or the sidewalk, from the geographical database;

computing a risk index for the at least one of the entrance or the exit of the area for the given time partition, based on the historical probe data, the map feature data, and the LOS data, wherein the risk index indicates a probability of occurrence of a hazard in the vicinity of the at least one of the entrance or the exit of the area;

storing the risk index as an attribute of the at least one of the entrance or the exit of the area in the geographical database; and generating a navigation instruction for an alternate navigation route in a device based on the risk index.

2. The method of claim 1, wherein the LOS data is based on a three-dimensional representation, one or more images, or a combination thereof of the entrance or the exit stored in the geographical database.

3. The method of claim 1, further comprising:

generating a notification signal based on the computed risk index, wherein generating the notification signal further comprises providing data for generating a navigation instruction for recommending an alternate route for navigation, such that the alternate route is associated with a lower risk index value than the computed risk index.

4. The method of claim 1, further comprising:

providing data for generating a warning when the risk index is greater than a first threshold value; and providing data for displaying the warning on a user interface device when the risk index is greater than the first threshold value.

5. The method of claim 1, wherein the map feature data comprises one or more of:

geometrical data, associated with the surroundings of the area as obtained from the geographical database, wherein the surroundings of the area comprise one or more of the physical objects in the vicinity of the area, the physical objects comprising at least: a sidewalk, a street furniture, a pedestrian, and a public transport stop;

a directionality parameter;

and a street feature, or a combination thereof.

6. The method of claim 1, further comprising computing the risk index based on a geolocated event data, wherein the geolocated event data comprises at least one of: an accident event data or an emergency event data.

7. The method of claim 1, wherein computing the risk index for the at least one of the entrance or the exit of the area for the given time partition, based on the historical probe data and the map feature data, comprises:

applying the historical probe data and the map feature data to a trained machine learning model; and computing a prediction output data using the trained machine learning model, the prediction output data being associated with the risk index.

8. The method of claim 7, wherein computing the prediction output data from the trained machine learning model further comprises generating a label value for the at least one of the entrance or the exit of the area based on the computed risk index, such that similar entrances or exits in a dataset of a plurality of entrances or exits are given the same label value, wherein the similarity of the entrances or exits are identified based on the map feature data associated with the corresponding entrances and exits.

9. The method of claim 8, wherein the machine learning model is trained using one or more training datasets comprising at least one of:

the historical probe data;

LOS data;

map feature data;

geolocated event data; and three-dimensional (3D) point cloud data obtained from one or more sensors of one or more probe vehicles in vicinity of the area; or a combination thereof.

10. The method of claim 1, further comprising:

providing data for generating a mapping user interface that presents a representation of the risk index.

11. The method of claim 1, wherein the area comprises one or more of: an underground parking area, a garage, and a basement.

12. The method of claim 1, wherein the given time partition comprises at least one of: a time of day, a time of week, a time of season, a time of year, or a combination thereof.

13. An apparatus comprising:

at least one processor; and at least one memory including computer program code for one or more programs, the at least one memory and the computer program code configured to, with the at least one processor, cause the apparatus to perform at least the following, acquire historical probe data associated with an area from one or more devices in the area, wherein the historical probe data comprises data associated with a distribution of vehicles entering or leaving the area in a given time partition;

obtain map feature data associated with at least one of an entrance or an exit of the area, from a geographical database, wherein the map feature data comprises data associated with one or more physical objects in vicinity of the area;

obtain line of sight (LOS) data between (a) the entrance and a street or a sidewalk, or (b) the exit and the street or the sidewalk, from the geographical database;

compute a risk index for the at least one of the entrance or the exit of the area for the given time partition, based on the historical probe data, the map feature data, and the LOS data, wherein the risk index indicates a probability of occurrence of a hazard in the vicinity of the at least one of the entrance or the exit of the area;

store the risk index as an attribute of the at least one of the entrance or the exit of the area in the geographical database; and generating a navigation instruction for an alternate navigation route in a device based on the risk index.

14. The apparatus of claim 13, wherein the LOS data is based on a three-dimensional representation, one or more images, or a combination thereof of the entrance or the exit stored in the geographical database.

15. The apparatus of claim 13, wherein the apparatus is caused to further perform at least the following:

generate a notification signal based on the computed risk index, wherein the generation of the notification signal further comprises providing data for generating a navigation instruction for recommending an alternate route for navigation, such that the alternate route is associated with a lower risk index value than the computed risk index.

16. The apparatus of claim 15, wherein to generate the notification the apparatus is caused to further perform at least the following:

provide data for generating a warning when the risk index is greater than a first threshold value; and provide data for displaying the warning on a user interface device when the risk index is greater than the first threshold value.

17. The apparatus of claim 15, wherein the map feature data comprises one or more of:

geometrical data, associated with the surroundings of the area as obtained from the geographical database, wherein the surroundings of the area comprise one or more of the physical objects in the vicinity of the area including, the physical objects comprising at least: a sidewalk, a street furniture, a pedestrian, and a public transport stop;

a directionality parameter; and a street feature, or a combination thereof.

18. The apparatus of claim 13, wherein to compute the risk index for the at least one of the entrance or the exit of the area for the given time partition, based on the historical probe data and the map feature data, the apparatus is caused to further utilize a geolocated event data, wherein the geolocated event data comprises at least one of: an accident event data or an emergency event data.

19. The apparatus of claim 13, wherein to compute the risk index for the at least one of the entrance or the exit of the area for the given time partition, based on the historical probe data and the map feature data, the apparatus is caused to further perform at least the following:

apply the historical probe data and the map feature data to a trained machine learning model; and compute a prediction output data using the trained machine learning model, the prediction output data being associated with the risk index.

20. A non-transitory computer-readable storage medium carrying one or more sequences of one or more instructions which, when executed by one or more processors, cause an apparatus to perform operations comprising:

acquiring historical probe data associated with an area from one or more devices in the area, wherein the historical probe data comprises a data associated with a distribution of vehicles entering or leaving the area in a given time partition;

obtaining map feature data associated with at least one of an entrance or an exit of the area, from a geographical database, wherein the map feature data comprises data associated with one or more physical objects in vicinity of the area;

obtaining line of sight (LOS) data between (a) the entrance and a street or a sidewalk, or (b) the exit and the street or the sidewalk, from the geographical database;

computing a risk index for the at least one of the entrance or the exit of the area for the given time partition, based on the historical probe data, the map feature data, and the LOS data, wherein the risk index indicates a probability of occurrence of a hazard in the vicinity of the at least one of the entrance or the exit of the area;

storing the risk index as an attribute of the at least one of the entrance or the exit of the area in the geographical database; and generating a navigation instruction for an alternate navigation route in a device based on the risk index.

* * * * *